United States Patent [19]
Sarkilahti

[11] 3,843,931
[45] Oct. 22, 1974

[54] METHOD FOR DEMODULATION OF A DIFFERENTIALLY PHASE-MODULATED SIGNAL

[75] Inventor: Risto Martti Sarkilahti, Haukilahti, Finland

[73] Assignee: Oy Nakia Ab

[22] Filed: Mar. 13, 1973

[21] Appl. No.: 340,835

[30] Foreign Application Priority Data
Mar. 17, 1972 Finland ................................ 732/72

[52] U.S. Cl..................... 329/104, 178/88, 325/320, 329/110
[51] Int. Cl. ............................................ H04l 27/22
[58] Field of Search ............ 329/104, 110; 325/320; 178/88

[56] References Cited
UNITED STATES PATENTS

| | | | |
|---|---|---|---|
| 3,479,457 | 11/1969 | Oswald | 325/320 X |
| 3,739,289 | 6/1973 | Bochmann | 329/104 |
| 3,746,995 | 7/1973 | Schroeder et al. | 325/320 |

*Primary Examiner*—Alfred L. Brody
*Attorney, Agent, or Firm*—Eric H. Waters

[57] ABSTRACT

A method for demodulation of a differentially phase-modulated signal. The phase of a received signal is measured digitally during each information-transfer element in relation to an independent reference signal. The phase difference is stored in numerical form in a memory. The final demodulation is carried out by evaluating the difference between the measured phases of two adjacent signal elements.

7 Claims, 2 Drawing Figures

METHOD FOR DEMODULATION OF A DIFFERENTIALLY PHASE-MODULATED SIGNAL

The present invention relates to a method for demodulation of a differentially phase-modulated signal.

Differential phase modulation is generally used for transferring of digital information, for example data modems (e.g., at a rate of 2,400 bit/s), in PCM links, etc.

The indicators of differentially phase-modulated signal at present in use as a rule comprise either a. a delay line, phase change circuits, product modulators, low-pass filters and pulse shapers or b. an oscillator synchronized to the carrier wave of the received signal, product modulators, low-pass filters, and pulse shapers.

A disadvantage of these demodulators is that analogical circuits are used, which are bulky and expensive to produce.

A purpose of the present invention is to eliminate this disadvantage. The method in accordance with the invention is therefore primarily characterized in that the phase of the received signal is measured digitally during each information-transfer element and the phase difference between the elements is established digitally.

Thus, according to the invention, the phase of the received signal is measured in relation to a certain reference signal. The frequency of the reference signal must be approximately equal to the frequency of the carrier wave of the received signal (the allowed deviation depends on the particular application concerned), but the phase may be any arbitrary one. The measurement of the phase is accomplished purely digitally. By subtracting the phase differences measured during two subsequent signal elements from each other, the phase shift can be determined.

An advantage of the invention is that the phase indicator can be accomplished digitally, in this way saving space and expenses, because digital components are cheaper than corresponding analogical ones. As the result is obtained in the digital form, the changes resulting from the number of different coding methods and phase levels can be accomplished by means of simple logical modifications.

The invention will be examined more closely below with the aid of the embodiments in accordance with the attached drawings.

Below, an application of the invention in 2400/3600 bit/s modem is presented as accomplished by means of a 4/8-level differential phase modulation.

Figure 2:
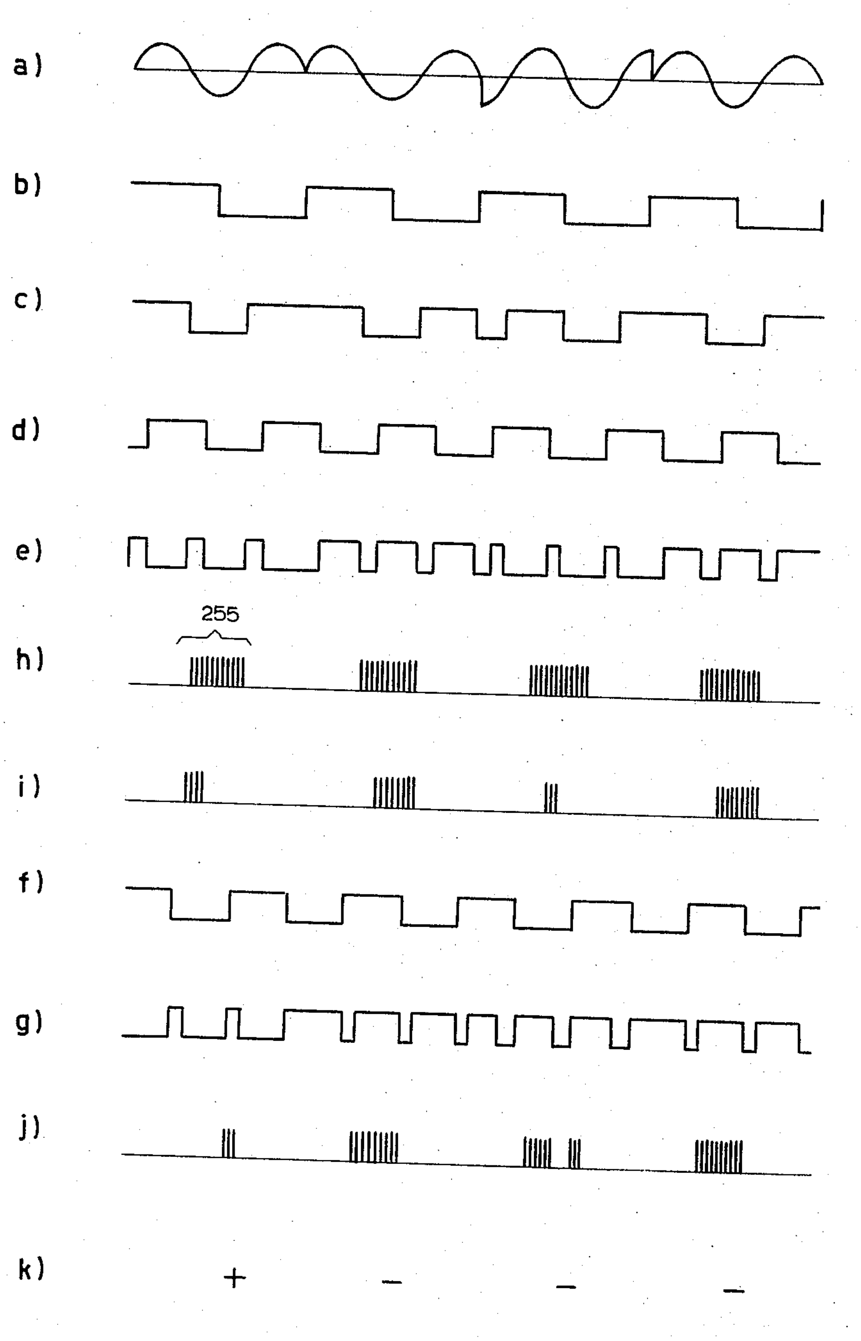
FIG. 2 shows curve forms of the signal at the different points *a* to *j* of the system in accordance with FIG. 1.

The received signal has a nature of curve *a*(FIG. 2). From this the timing signal of transfer elements (curve *b*, FIG. 2) is formed. This can be accomplished, for example, by means of an envelope detector and by conducting through a resonance circuit tuned at the modulation frequency, whereupon it is limited by means of a pulse shaper into a rectangle wave.

Figure 1:
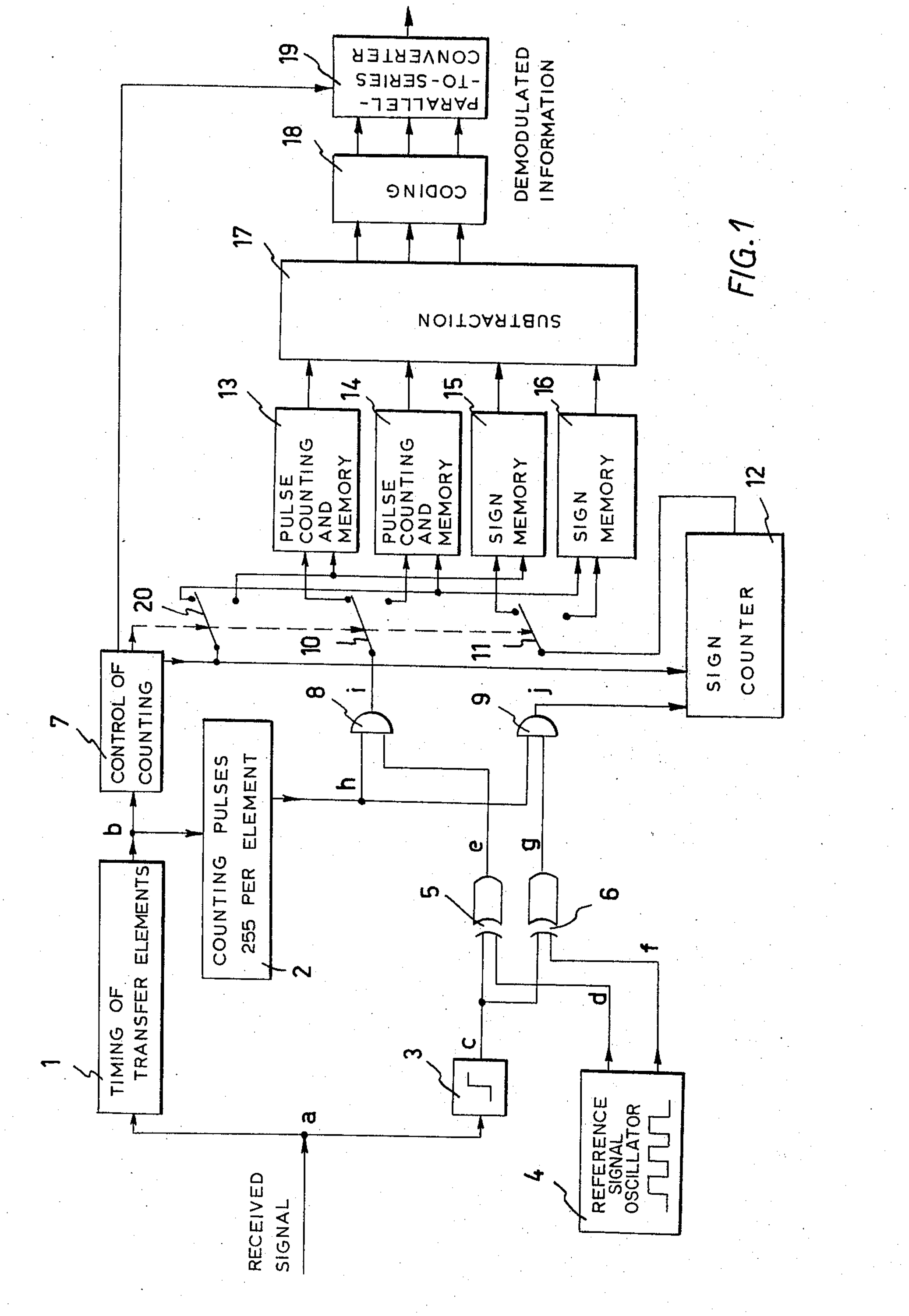
FIG 1 shows a block diagram of a system to be used for the application of the method in accordance with the invention.

The phase difference between the received signal and the reference signal is measured by initially shaping them into rectangle waves (signals *c* and *d*, FIG. 2). These are made by means of a known "Exclusive-Or" circuit 5 into signal *e*. The share of the time of state 1 of signal *e* is proportional to the absolute value of the phase angle between the signals *c* and *d*. This ratio is measured digitally by the signal elements developing a total of 255 pulses (curve *h*, FIG. 2) and by counting the number of the pulses that occur at the point of time at which the signal *e* is in state 1 (curve *i*, FIG. 2). The sign of the phase difference is obtained by comparing the received signal and a signal at an angle of 90° to the reference phase (curve *f*, FIG. 2) with each other as above, and the signal *g* is obtained. If the ratio of the time of state 1 and of the time of state 0 of signal *g* is 1, the sign is positive and vice versa. The phase angle and sign measured in this way are stored for the time of the next transfer element, at which time a new measurement is carried out to another memory (FIG. 1). After the new value has been obtained, their difference is calculated, from which a conclusion is made in accordance with to which expected phase difference it is closest.

The measured phase difference is directly in the digital form, from which the information itself is obtained by means of a simple code conversion.

The method can be applied to all differential phase indicators in which the frequency of the reference signal can be made equal to that of carrying wave of the received signal with such a precision that no significant phase shift occurs between adjoining information shift elements.

Below, the system in accordance with FIG. 1 will be examined in detail as an example case.

The following example comprises the components relating to the demodulation of a four-phase differentially modulated 2400 bit/s or an eight-phase 3,600 bit/s modem in accordance with the CCITT recommendation V 26.

The timing of the transfer elements is carried out (block 1) from the received signal by means of an envelope detector. The detected signal is conducted through a resonance circuit tuned at the modulation frequency, whereupon it is limited into a rectangle wave.

By means of the obtained signal, the clock signal (1,200 c/s) of the receiver is synchronized digitally by correcting its phase by ± 1/192 parts per each cycle.

In the middle of each transfer element, 255 counting pulses are formed (block 2). The counting pulses are divided over the half cycle duration of the carrier wave which forms the counting time. The resonance circuit, which does not form of the invention itself, is located in Block 1 of FIG. 1. These are obtained by means of the signal "counting time" and from the 921.6 kc/s rectangle wave by means of an electronic switch.

The signal "counting time" is true during each transfer element for one half of the duration of the carrier wave cycle.

The received signal is limited by means of a limiter 3 into a rectangle wave for the purpose of demodulation.

The reference signal is a rectangle wave signal which is produced by means of an oscillator 4 of the receiver and the frequency of which is approximately the same as the frequency of the carrier wave (1,800 c/s). For the demodulator two reference signals are required the phase difference between which is 90°.

The modulo-2-sum of the received signal and the reference signals is formed by means of the Exclusive-Or circuit 5, 6.

Between the counting times the following operations are carried out (control of counting, block 7):

the difference of the performed subtraction (demodulated result) is transferred through the coder 18 to the parallel-to-series converter 19, the counting memories 13, 14 and the sign memories 15, 16 are interchanged so that the figure that was to be subtracted becomes the subtrahend in the following calculation. The former subtrahend is cleared and the following counting pulses are conducted to this cleared memory and a new figure to be subtracted is obtained.

the sign counter 12 is cleared between every counting time.

The phase difference (absolute value) of the received signal and the reference signal is obtained digitally by counting the number of the counting pulses that occur when the modulo-2-sum of the received signal and the reference signal is 1 (point 5).

The value *i* of the calculated phase angle is conducted to the 8-bit counter 13 or 14, which functions at the same time as a memory. In this way the phase difference is obtained with 8 bits in a parallel form.

The sign of the measured phase difference is obtained by measuring the phase difference between the received signal and the signal that has a phase difference of +90° to the reference signal used ahead. If this phase difference is bigger than 90°, the sign is positive, and if it is smaller than 90°, the sign is negative.

The phase measurement takes place as in section 8 and the "counted value" signal is conducted to the 8-bit counter.

If the signal "sign" is 0, the number of "counted value" pulses (signal *j*, FIG. 2) has been less than 128, and thus the phase angle concerned has been inferior to 90° and thus the sign of the said measured phase difference is + and vice versa.

The sign memories 15, 16 are simple "latch" memories. The memory occurs in the same state as the "sign" signal when the "switch" signal is true.

By means of the switch signal the counted value is conducted over the switches 10, 11, 20 to the memory 13 to 16 that is required at each particular time.

The switch 10, 11 is a flip-flop, which guides the counting pulses or the counted sign to the memory point concerned.

After the phases of two subsequent signal elements have been measured at the precision of 8 bits plus the sign (total 9 bits) in relation to the reference signal, the subtraction between them is carried out in the parallel form by means of two (4 bit binary full adders 17.)

The subtraction is converted into addition by complementing the subtrahend. This is performed by means of Exclusive-Or circuits for each bit. The difference is obtained with 8 bits plus the sign, of which the sign and the 3 most significant bits are sufficient for consluding the demodulated data.

In coding (block 18) the measured phase difference is converted so that it corresponds to an agreed bit combination.

In the parallel-to-series converter 19 the 2 or 3 bits transmitted in parallel mode in the transfer path are converted back to the series mode.

EXPLANATIONS OF FIG. 2 a. Phase-modulated signal
b. Timing of transfer elements
c. Limited signal
d. 0°-reference signal
e. modulo-2-sum 1
h. Counting pulses (255 pcs)
i. Absolute value of angle as pulses
f. +90°-reference signal
g. modulo-2-sum 2
j. Counting of sign
k. Conclusion about the sign.

What I claim is:

1. A method for demodulation of a differentially phase-modulated signal in a receiver, comprising: measuring digitally the phase of the signal as received during each information-transfer element in relation to an independent reference signal, storing the phase difference in numerical form in a memory, subtracting the phase differences measured during two subsequent signal elements from each other, measuring the phase difference between the received signal and the reference signal by first shaping them into rectangular waves which are fed through an Exclusive-Or circuit, the share of the time of the 1-state of the obtained signal being proportional to the absolute value of the phase angle between the rectangular waves, measuring the ratio digitally by developing a certain number of pulses and by counting the number of pulses that occur at the point of time at which the obtained signal is in the 1-state, obtaining the sign of the phase difference by comparing with each other the received signal and a signal in an angle of +90° to the reference signal, storing the measured phase angle as bits as well as the said sign for the time of the next transfer element, at which time a new measurement is carried out to another memory, and when the new values have been obtained, calculating their difference whereby the conclusion is drawn in accordance with to which expected phase difference it is closest.

2. A method as claimed in claim 1, wherein the sign of the phase difference is obtained by means of a second Exclusive-Or circuit so that if the ratio of the duration of the 1-state and the 0-state of the signal in this way obtained is below 1, the sign is positive and vice versa.

3. A method as claimed in claim 1, wherein said reference signal is produced in the receiver.

4. A method as claimed in claim 1, wherein said reference signal is synchronized to the received signal.

5. A method as claimed in claim 1, wherein said reference signal is synchronized to the timing of the transfer elements.

6. A method as claimed in claim 2, wherein the reference signal (d) is developed independently in the receiver, the indication being differentially coherent.

7. A method as claimed in claim 2, wherein the reference signal (d) is synchronized with the received signal, the indication being coherent.

* * * * *

UNITED STATES PATENT OFFICE
CERTIFICATE OF CORRECTION

Patent No. 3,843,931 Dated October 22, 1974

Inventor(s) Risto Martti Sarkilahti

It is certified that error appears in the above-identified patent and that said Letters Patent are hereby corrected as shown below:

On the Cover Sheet, in item [73] "Oy Nakia Ab" should read -- Oy Nokia Ab --.

Signed and sealed this 4th day of March 1975.

(SEAL)
Attest:

RUTH C. MASON
Attesting Officer

C. MARSHALL DANN
Commissioner of Patents
and Trademarks